Feb. 18, 1941.                J. CONFER                2,232,513
                           ADJUSTABLE UNION
                          Filed March 29, 1940
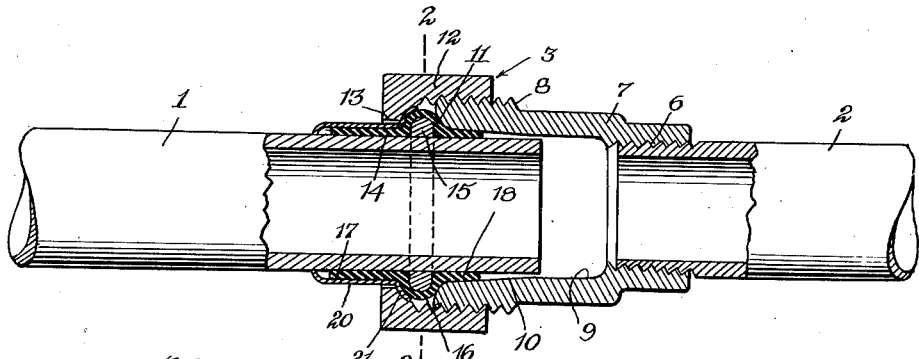
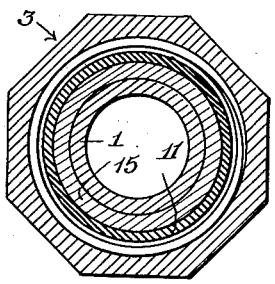 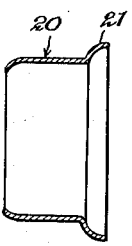 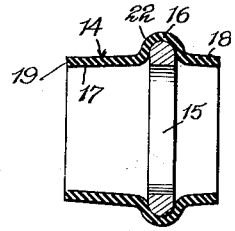
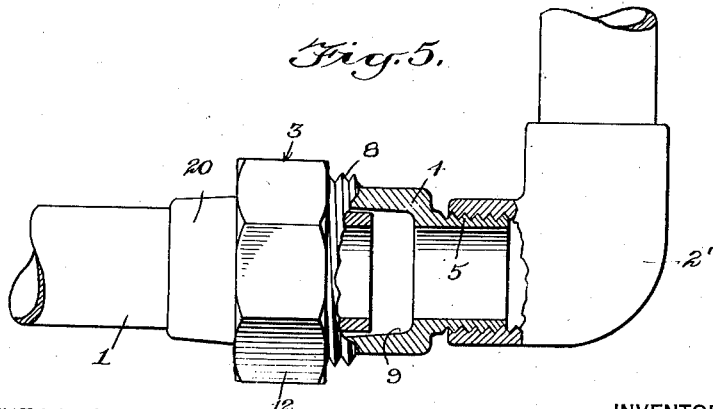
WITNESSES                                    INVENTOR
                                             Joe Confer
                                          BY
                                              ATTORNEYS Patented Feb. 18, 1941

2,232,513

UNITED STATES PATENT OFFICE 2,232,513

ADJUSTABLE UNION

Joe Confer, New York, N. Y.

Application March 29, 1940, Serial No. 326,693

2 Claims. (Cl. 285—122)

This invention relates to unions and particularly to an adjustable union, an object being to provide a construction wherein pipes may be easily connected and disconnected in a small space.

Another object of the invention is to provide an improved adjustable union structure wherein the parts may be adjustable longitudinally of the pipe according to the relative position thereof in connection with another pipe or other fitting.

An additional and more specific object of the invention is to provide a union which not only may be mounted and demounted quickly, but wherein a compressed gasket is used to maintain a water- and air-tight connection between the respective parts.

In the accompanying drawing—

Fig. 1 is a longitudinal vertical sectional view through adjacent ends of a pair of pipes and through a union embodying the invention;

Fig. 2 is a transverse sectional view through Fig. 1 approximately on the line 2—2;

Fig. 3 is a sectional view through a tubular guide embodying certain features of the invention;

Fig. 4 is a longitudinal sectional view through a tubular gasket embodying certain features of the invention;

Fig. 5 is a view partly in elevation and partly in section, illustrating how the union may be connected with an elbow.

Referring to the accompanying drawing by numerals, 1 and 2 indicate pipes of any conventional kind, while 3 indicates a union. Union 3 may be used to connect pipes 1 and 2, as shown in Fig. 1, or it may be used to connect 1 with an elbow 2' or other fitting of the same type. The only difference in construction is that the fitting 4 is provided with exterior threads 5 in Fig. 5 and provided with interior threads in Fig. 1 in order to receive the exteriorly threaded pipe 2. The threaded portion 5 may be screwed into an elbow, T-fitting, or any other desired structure having interior threads. As illustrated in Fig. 1, the union is provided with a fitting 7, which is the same as the fitting 4 except for the internally threaded portion 6 and, therefore, the same numerals will apply to the same structure in Figs. 1 and 5 except as pointed out. The fitting 7 is also provided exteriorly with threads 8 and interiorly with a bore 9 sufficiently large to permit the pipe 1 to be inserted various distances, as for instance, until it strikes the threaded portion 6. Also bore 9 merges into a tapering or flaring portion 10. This flaring portion merges into a rounded end portion. It will be understood that pipe 1 is an ordinary pipe and naturally is a straight tubular structure. A clamping nut of a well-known kind having a depending annular flange 13 is screwed on to the threaded section 9 and acts to clamp the gasket 14 in a functioning position.

The gasket 14, as shown in Fig. 4, consists of an abutment ring 15, which may be metal or other desired material but is preferably stiff or rigid and very strong. This abutment ring fits into an annular upstanding portion 16 of the gasket body 17, which may be made of rubber, lead, or other pliable and compressible material. The annular upstanding portion 16 is provided with a short end portion 18 and a longer end portion 19. When the gasket is in use it is positioned substantially as shown in Fig. 1 with the portion 18 fitting into the tapering or flaring portion 10 of the fitting 7. The upstanding annular portion 16 fits against the annular end 11. A metal guide 20 surrounds the end portion 19 and the pressure head 21 thereof presses against the side wall portion 22 of the annular upstanding member 16 so as to crowd the body 17 downwardly from one side of the ring 15 downwardly while the end 11 crowds the other side downwardly, whereby there will be a tight contact between the gasket and the pipe 1. This clamping action is produced by tightening the nut 12 and as the nut 12 is tightened the flange 13 will press against the rear surface of head 21 and move the entire gasket to the right as shown in Fig. 1 until all parts are tightly in contact, whereby a liquid- and air-tight connection is presented.

It will be readily observed that the union may be moved longitudinally relative to pipe 1 to take care of various circumstances and when properly positioned will function to provide a tight connection.

I claim:

1. In an adustable union structure for pipes, a gasket having a tubular body of compressible material provided intermediate its ends with an annular upstanding portion and a rigid ring fitting in said annular upstanding portion, said ring having a bore of substantially the same diameter as the bore in said body, whereby the surface of the ring will be in the same plane as the surface of the bore of said body.

2. In an adjustable union structure for pipes, a gasket having a tubular body of compressible material provided intermediate its ends with an annular upstanding portion, a rigid ring in said annular upstanding portion, said ring having a bore of substantially the same diameter as the bore in said body, whereby the surface of the ring will be in the same plane as the surface of the bore of said body, and a metal sleeve having an annular head arc-shaped in cross section fitting against one side of said upstanding portion of said gasket and extending therefrom over one edge of said gasket.

JOE CONFER.